(12) United States Patent
Bahmad

(10) Patent No.: US 6,401,374 B1
(45) Date of Patent: Jun. 11, 2002

(54) MESSAGE DISPLAY DEVICE FOR MOTOR VEHICLE

(76) Inventor: Reslan Bahmad, 190 Wadsworth Ave. #35, New York, NY (US) 10033

(*) Notice: Subject to any disclaimer, the term of this patent is extended or adjusted under 35 U.S.C. 154(b) by 0 days.

(21) Appl. No.: 09/572,798

(22) Filed: May 17, 2000

Related U.S. Application Data

(60) Provisional application No. 60/136,354, filed on May 28, 1999.

(51) Int. Cl.[7] .............................................. G06F 21/04
(52) U.S. Cl. .............................. 40/593; 40/591; 40/564; 40/575
(58) Field of Search .......................... 40/593, 591, 643, 40/442, 564, 575, 606, 610; 340/901

(56) References Cited

U.S. PATENT DOCUMENTS

| 3,237,330 | A | * | 3/1966 | Dinstbir | 40/593 |
|---|---|---|---|---|---|
| 4,264,979 | A | * | 4/1981 | Gutowski | 40/593 |
| 4,470,214 | A | * | 9/1984 | Kinloch | 40/593 |
| 4,574,269 | A | * | 3/1986 | Miller | 340/97 |
| 4,860,476 | A | * | 8/1989 | Hall | 40/593 |
| 4,862,614 | A | * | 9/1989 | Shettleroe | 40/593 |
| 4,949,071 | A | * | 8/1990 | Hutchison | 340/468 |
| 5,099,594 | A | * | 3/1992 | Reas et al. | 40/593 |
| 5,339,551 | A | * | 8/1994 | Elmer | 40/591 |
| 5,479,735 | A | * | 1/1996 | Martin, Jr. | 40/593 |
| 5,838,228 | A | * | 11/1998 | Clark | 340/436 |
| 6,178,677 | B1 | * | 1/2001 | Williams | 40/593 |

* cited by examiner

Primary Examiner—Lynne H. Browne
Assistant Examiner—James M Hewitt
(74) Attorney, Agent, or Firm—Goldstein Law Offices, P.C.

(57) ABSTRACT

A message display device for selectively displaying a variety of different messages from the rear of a vehicle. The message display device includes a message box that has a message plate with an inscribed message removably mounted thereon. The message box is secured on top of an adjustable bracket or a fixed bracket that is mounted to a vehicle surface. The message box is preferably mounted just inside the rear window, facing outward. The message display device is connected to the fuse box and is provided with a control switch that is mounted on the dash board of the vehicle to allow the driver to activate the message display device to illuminate the message plate.

1 Claim, 1 Drawing Sheet

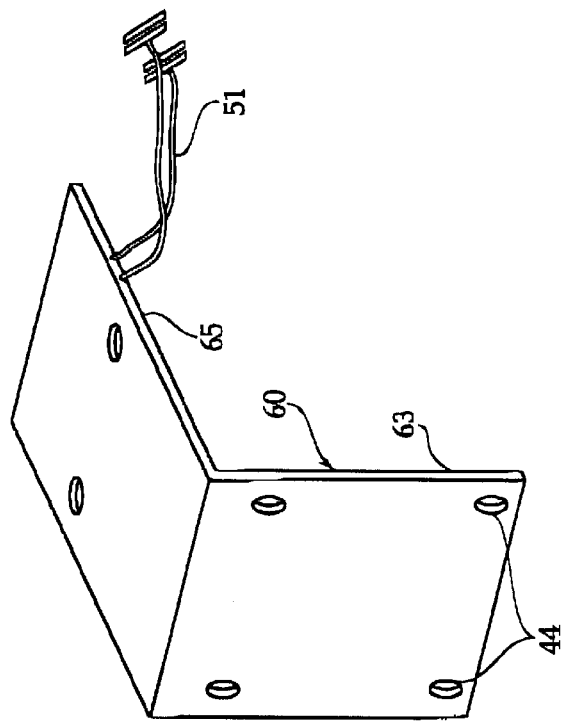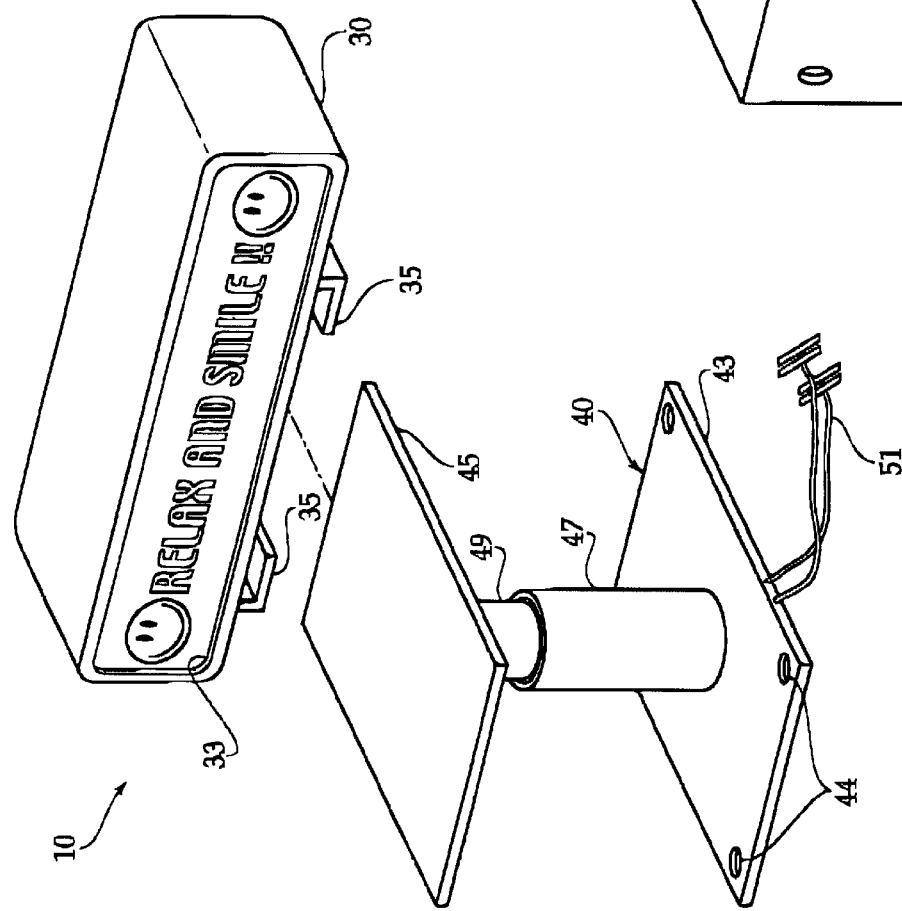

MESSAGE DISPLAY DEVICE FOR MOTOR VEHICLE

CROSS REFERENCES AND RELATED SUBJECT MATTER

This application relates to subject matter contained in provisional application serial No. 60/136,354, filed in the United States Patent and Trademark Office on May 28, 1999.

FIELD OF THE INVENTION

The present invention relates to a message display device, and more particularly to a message display device for displaying messages from the rear of a motor vehicle.

BACKGROUND OF THE INVENTION

Drivers of automobiles travelling down a road are together engaged in a potentially dangerous activity. The actions of one driver must be dictated by the intentions of other drivers in the vicinity. Accordingly, it is important that the drivers maintain some form of communication to keep driving safely.

Typically inter-driver communication takes two forms: actions and signals. Actions, such as the position of the car in a lane, slowing while approaching a corner, and drifting toward one side—all indicate that a car has the intention to make a turn. Signals, such as a blinking directional light on the automobile, affirmatively indicates that it is the drivers intention to turn or change lanes. Most of the time, these forms of communication is sufficient to prevent driver conflicts and to keep driving a safe activity.

Often however, drivers wish to communicate more complex ideas with other drivers. At that time, communication can become quite difficult, and even dangerous. Attempts at verbal communications between drivers require, at minimum, face to face visual contact. This requires that the drivers bring their automobiles in close, side-by-side proximity. Such proximity is often dangerous in itself, especially at highway speeds. Further, it requires that each of the drivers look sideways, and take their eyes off the road. Still further, unless both drivers are proficient at reading lips, they will often try to lower their windows in order to hear. All of these steps create hazards and difficulties that make verbal communication not worth attempting.

However, there are certain situations where verbal communication might be necessary to diffuse a potentially dangerous situation. For example, "road rage" has become increasingly common on our highways. A person who feels they have been "wronged" by another driver can often take dangerous and even deadly action. Many experts agree that some type of communication can help diffuse such a situation and prevent serious consequences. Unfortunately, for the foregoing reasons, such verbal communication is often impossible to achieve. Further, misheard or misunderstood communications can further exacerbate the situation.

Others have proposed signalling devices which attempt to increase the ability to communicate with other drivers. While these prior art units may be suitable for the particular purposes employed, or for general usage, they would not be as suitable for the purposes of the present invention that is disclosed hereinafter.

SUMMARY OF THE INVENTION

It is an object of the present invention to provide a message display device for use with automobiles which allows effective communication of verbal messages with other drivers.

It is another object of the invention to provide a message display device which allows a variety of messages to be selected by the driver, for display to other motorists.

It is yet another object of the invention to provide a message display device which is easily visible to other motorists, accordingly, the display device is preferably mounted in the rear of the automobile, and is preferably mounted just inside the rear window, facing outward.

It is a further object of the present invention to provide a device that allows users to selectively display a variety of different messages from the rear of their vehicles. Accordingly, the present invention discloses a message display device that is securely mounted at the rear of the vehicle. The message display device selectively displays one of a plurality of messages. The message display device is connected to the fuse block in the vehicle, and has a switch mounted on the dash board to allow users to activate the message display.

To the accomplishment of the above and related objects the invention may be embodied in the form illustrated in the accompanying drawings. Attention is called to the fact, however, that the drawings are illustrative only. Variations are contemplated as being part of the invention.

BRIEF DESCRIPTION OF THE DRAWINGS

The above and other aspects, features and advantages of the present invention will be more apparent from the following detailed description thereof, which is presented in conjunction with the following drawings, wherein corresponding reference characters indicate corresponding components throughout the drawing figures.

FIG. 1 is a diagrammatic perspective view of the message display device comprising an adjustable bracket for mounting the message box to a vehicle.

FIG. 2 is a diagrammatic perspective view of a fixed bracket for mounting the message box to a truck or van.

DETAILED DESCRIPTION OF THE PREFERRED EMBODIMENTS

FIGS. 1–2 show a message display device 10 that is mounted at the rear of an automobile. The message display device 10 is mounted at the rear of a vehicle (not shown) in a manner which is visible to other vehicles. According to the invention, it is possible to selectively adjust the message display device 10 so that it displays the desired message.

As shown in FIG. 1, the message display device 10 comprises a message box 30. The message box 30 is provided with a message plate 33 that has a message inscribed thereon. According to the present invention, the user may be provided with a plurality of message plates 33, each having a different message inscribed thereon. Suggested messages include "I Need Help—Call 911", "Baby on Board", "Don't Honk", "Be Quiet", "Relax and Smile", or "Sorry". The messages are sized so as to be reasonably legible to other motorists located a safe distance away from the vehicle. It is possible to place the selected message plate 33 in the message box 30 by simply sliding the message plate 33 into its mounting position towards the front of the message box 30. To facilitate the mounting of the message plate 33 within the message box 30, the message box 30 has a slot and a ridged surface towards its front that is capable of holding the message plate 33 is place.

The message display device 10 is provided with a bracket for mounting it to a vehicle surface of the vehicle. Preferably, the message display device 10 is mounted inside the vehicle, facing outwards. A suitable location for mounting is just inside the rear window. According to the first embodiment, an adjustable bracket 40 is provided to secure the message box 30 on a vehicle surface, such that the height of the message box 30 may be adjusted relative to the vehicle surface. According to the second embodiment shown in FIG. 2, a fixed bracket 60 is provided to secure the message box 30 to the vehicle surface, wherein said vehicle surface is vertical. Use of the fixed bracket 60 does not allow adjustment of the relative height of the message box 30.

The adjustable bracket 40 comprises a bottom plate 43, which is secured to the vehicle surface. The plate 43 is provided with a plurality of screw holes 44, each of which allows a screw or a bolt to pass therethrough for fastening the message display device 10 to the vehicle surface. The bottom plate 43 has a cylindrical piston sleeve 47 extending vertically therefrom. An adjustable plate 45 for mounting the message box 30 thereon is provided, wherein the adjustable plate 45 has a cylindrical piston 49 mounted thereon and extending into the piston sleeve 47. According to the invention, the piston 49 may be adjusted within the piston sleeve 47, such that the adjustable plate 45 can be selectively moved upward or downward relative to the vehicle surface.

The message box 30 has a pair of facing right angle sleeves 35 on its lower surface wherein the sleeves are capable of receiving the adjustable plate 45 therebetween. The message display device 10 is secured onto the vehicle by inserting the attachment plate 45 into the pair of facing right angle sleeves 35.

According to the second embodiment, used for attaching the device on a truck or van, the fixed bracket 60 comprises a vertical mount 63 that has a fixed attachment plate 65 extending horizontally from its top. The vertical mount 63 is provided with a plurality of screw holes 44, each of which allows a screw or a bolt to pass therethrough for securing the message display device 10 to a vertical surface of the vehicle. The message display device 10 is secured on the vertical surface by inserting the fixed attachment plate 65 into the sleeves 35 of the message box 30.

As shown in FIGS. 1 and 2, the adjustable bracket 40 and the fixed bracket 60 are each provided with a pair of wires 51, wherein one of the wires 51 is connected to the fuse box of the vehicle for powering the message display device 10. The second wire is attached to a control switch (not shown) on the vehicle's dash board, wherein the switch allows the driver to activate the message display device 10 to selectively illuminate the message plate.

According to the invention, the adjustable plate 45 as well as the fixed attachment plate 65 are each capable of supplying power to within the message box 30. The bottom surface of the message box 30 is constructed from a conductive material to receive the power supplied by the adjustable plate 45 or the fixed attachment plate 65.

In summary, herein is disclosed a message display device that is provided with a message box that has a message plate with an inscribed message mounted thereon. The message box is secured on top of an adjustable bracket or a fixed bracket that is mounted onto a vehicle surface. The message display device is connected to the vehicle's fuse box and is provided with a control switch on the dash board to allow the driver to activate the message display device.

Many specific details contained in the above description merely illustrate some preferred embodiments and should not be construed as a limitation on the scope of the invention. Accordingly, many other variations are possible within the spirit of the present invention.

What is claimed is:

1. A message display device for selectively displaying different messages imprinted on message plates, from the rear of a vehicle, the device comprising:

a message box, for receiving a message plate with an message imprinted thereon, the message box capable of selectively illuminating the message plate so that it is visible to other motorists, the message box having electical connections for supplying power thereto and for selectively remotely enabling illumination of the message plate located within said message box, the message box having a lower surface and a pair of facing right angle sleeves on the lower surface; and an adjustable bracket, having a bottom plate having holes for attaching said bottom plate to a vehicle surface, an adjustable plate, a piston mounted to the adjustable plate, a piston sleeve mounted to the bottom plate, the piston extending and slidable within the piston sleeve for allowing height adjustment of the adjustable plate, the adjustable plate sized to fit within the facing right angle sleeves for mounting the message box upon the adjustable bracket.

\* \* \* \* \*